United States Patent
Purrer

[15] 3,705,482
[45] Dec. 12, 1972

[54] FIELD HARVESTER FOR ROW CROPS
[72] Inventor: Josef Purrer, Gottmadingen, Germany
[73] Assignee: Maschinenfabrik Fahr AG, Gottmadingen, Germany
[22] Filed: Feb. 10, 1971
[21] Appl. No.: 114,329

[30] Foreign Application Priority Data
Feb. 12, 1970 Germany...........P 20 06 232.2

[52] U.S. Cl. ............56/13.9, 56/14.3, 56/16.2, 56/60, 56/95
[51] Int. Cl. ............A01d 45/02
[58] Field of Search............56/13.4, 13.6–13.9, 56/14.3, 16.2, 60, 61, 95, 110, 119

[56] References Cited

UNITED STATES PATENTS

| | | |
|---|---|---|
| 541,875 | 7/1895 | Packer.............56/119 |
| 2,477,794 | 8/1949 | Gehl.............56/13.9 |
| 1,145,890 | 7/1915 | Gronke............56/110 |
| 1,121,998 | 12/1914 | Gray.............56/13.9 |
| 3,508,387 | 4/1970 | Wright............56/95 |

FOREIGN PATENTS OR APPLICATIONS

| | | | |
|---|---|---|---|
| 1,578,290 | 8/1969 | France............56/13.4 |
| 127,503 | 8/1960 | U.S.S.R............56/119 |

Primary Examiner—Louis G. Mancene
Assistant Examiner—J. A. Oliff
Attorney—Karl F. Ross

[57] ABSTRACT

A field harvester for row crops, especially stalk crops such as corn, has a stalk-entrainment device formed by a pair of rearwardly converging augers or conveying worms which, at the rear of the entrainment device, are in superposed relationship to deposit stalks upon a conveyer with the butt end of the stalk forwardly. The stalks then move transversely beneath a feed drum to the chopper and blower blades. The cutter consists of a plurality of blades arranged on a disk rotated at the base of the throat of the stalk-guide device.

11 Claims, 6 Drawing Figures

Josef Pürrer
INVENTOR.

BY
Karl F. Ross
Attorney

Josef Pürrer
INVENTOR.

BY

Karl F. Ross
Attorney 3,705,482

FIELD HARVESTER FOR ROW CROPS

FIELD OF THE INVENTION

My present invention relates to field harvesters and, more particularly, to a field harvester for a row crop, especially a stalk crop such as corn.

BACKGROUND OF THE INVENTION

Forage and field harvesters for the preparation of comminuted forage from standing crops are, of course, known and available in many types. Present agricultural methods can, however be classified in two main categories, depending upon the location at which the crop is comminuted. For example, the preparation of silage from standing crops, e.g. grasses and stalk crops such as corn, may require field chopping or chopping of the crop in the region of the silo or storage bin. In the latter case, the crop is cut and gathered in suitable wagons and delivered to the silo or storage site at which a chopper is provided to comminute the crop material. The other system has, however, proved to be more effective for this purpose.

In the field chopping of forage crops, therefore, a field harvester may be provided which comprises a crop pickup or guide device for lifting previously cut crop material from a windrow previously formed or some other collection of the crop material on the ground, conveyer means for feeding the crop material to a chopper blade and a chopper and/or blower arrangement for comminuting the crop material and projecting it through a duct system into a forage wagon disposed behind or alongside the harvester.

It is also a common practice to provide a harvester with cutting means for separating the crop material from the ground simultaneously or immediately prior to entrainment of the crop material into the machine.

A problem arises with row and stalk crops such as corn, which by contrast with grasses, must be held and guided firmly so that the heavy stalks are led with a proper orientation to the cutting blades and do not foul or obstruct operation of the machine. It is not uncommon, therefore, for a row crop or "corn" head to be provided on such machines for the purpose of guiding the stalks to the cutter blade.

In one conventional system, for example, the pickup and guide device or head has a rearwardly converging throat and a relatively wide mouth, the sides of the pickup head straddling the row of crop material. A reciprocating-blade or sickle-bar cutter is provided at the lower portion of the forwardmost part of the device, i.e. the mouth of the stalk-guide head and a pair of chains is provided along each side of the head and, therefore, the row of stalks for entraining the stalks into the throat of the apparatus after cutting. The chains have inwardly extending fingers which are interdigitated with the fingers of the opposing chain and the sickle-bar cutter is disposed between these chains.

This system has, however, the disadvantage that the stalks are not always fed with the proper orientation to the cutter and to any conveyer means leading to the cutter or chopper. It is not uncommon, for example, for the stalk to slip in the space between the chains and to be deposited upon the conveyer in a skew or reversed orientation.

I may also remark, at this point, that best results are obtained in chopping a stalk crop such as corn, when the butt or cut end of the stalk is fed first to the chopper and to the feed drum or roller ahead of the chooper. With chain systems, this orientation of the stalks cannot be assured and more complicated guide arrangements have proved to be ineffective because of their tendency to breakdown and the like.

THE OBJECTS OF THE INVENTION

It is the principal object of the present invention to provide an improved field harvester in which the aforementioned disadvantages can be obviated and which provides improved results in the handling of crop materials.

It is a more specific object of the invention to provide a forage harvester or field chopper for row and stalk crop, especially corn, which ensures consistent feed of the stalks cut-end first to the chopper portion of the apparatus.

It is another object of the invention to provide an apparatus for the purposes described in which the stalk-guide means is relatively simple, has sufficient structural integrity to avoid repeated breakdown, and is capable of guiding and orienting the stalk crop for purposes of comminution.

A further object is to provide a field harvester of the character described which is of simple and inexpensive construction and yet functions more effectively than earlier devices for similar purposes.

SUMMARY OF THE INVENTION

These objects and others which will become apparent hereinafter, are attained in accordance with the present invention, by providing, in a forage harvester of the type having a cutter or chopper (preferably rotatable about a horizontal axis extending generally in the direction of travel of the apparatus) and a conveyer band moving in the direction of the chopper for feeding the stalks into the inlet chamber of the housing leading to this chopper, a stalk-orientation and intake arrangement which comprises a pair of adjacent, rearwardly converging worms, screws or augers which are rotated in opposite senses and are provided with helices or spirals guiding the stalks into the throat of the intake device.

At the rearward end of the latter, the worms are disposed one above the other so as to deflect the tops of the stalks away from the conveyer band while permitting the cut ends of the stalks to ride upwardly thereon. The worms, of course, are rotated in such sense that they facilitate feeding of the stalks onto the conveyer band. Furthermore, the worms rise in the rearward direction while the conveyer band has a portion remote from the chopper reaching substantially beneath the screw or auger arrangement to receive the cut ends of the stalks. The superposed relationship of the rearward ends of the auger automatically orients the stalks and facilitates the transverse feed thereof onto the conveyer belt to effect a transfer to the latter with no additional mechanical parts.

According to a more specific feature of the invention, the depth of the worm increases progressively from the bottom end thereof to the upper end and rearward end so that, at least proximal to the rearward end, the ribs of the worms overlap or have intersecting paths. When the paths of the worms intersect in this manner, it is found that the rate at which the cut crop is fed to the chopper, is increased.

The transverse feed rate can be augmented also by providing at least over the length of the worms at which they are superposed, entrainment teeth adapted to engage the crop material. Such teeth may be provided in the form of angularly equispaced blades, each of which has a serrated or toothed edge, the blades of the two worms being in interleaved or aligned relationship. Facing the intake device, moreover, it has been found to be advantageous to provide the right-hand worm such that its rearmost end overlies the rearmost end of the left-hand worm while the right and left-hand worms are respectively driven in the counterclockwise and clockwise senses.

According to still another feature of the invention, at the throat of the intake device, i.e. inwardly from the mouth thereof, a cutting arrangement is provided in the form of a blade-carrying disk. The latter, having a diameter corresponding approximately to the width of the throat, may be oriented for rotation about an axis in a vertical plane but inclined to the horizontal and vertical, preferably at an angle of 45° to the ground. The disk carries a plurality of angularly equispaced radially extending cutting blades and is rotated in the counterclockwise sense, as viewed in the direction indicated earlier, when the conveyor means is disposed at the right-hand side of the apparatus. Consequently, the cutter disk promotes movement of the crop material onto and upwardly along the conveyer. More generally, the worm proximal to the conveyer will be located above the other worm at the rearward ends of these worms and will be rotated such that the crop material is urged into the gap between the worms.

The cutting disk, moreover, is rotated such that its lower edge moves in the direction of the conveyer The latter may have its end remote from the chopper located at approximately the effective cutting level of the blade disk while its other end lies higher and may reach just below a feed drum capable of crushing the crop material while feeding it into the chopper. The latter may consist of a blade reel co-operating with a chopper bar.

Finally, I prefer to provide the intake device and the conveyer assembly in a single unit which may be swingable about the axis of, say, the upper roll of the conveyer so that the intake device may be moved out of the way or transport of the apparatus.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
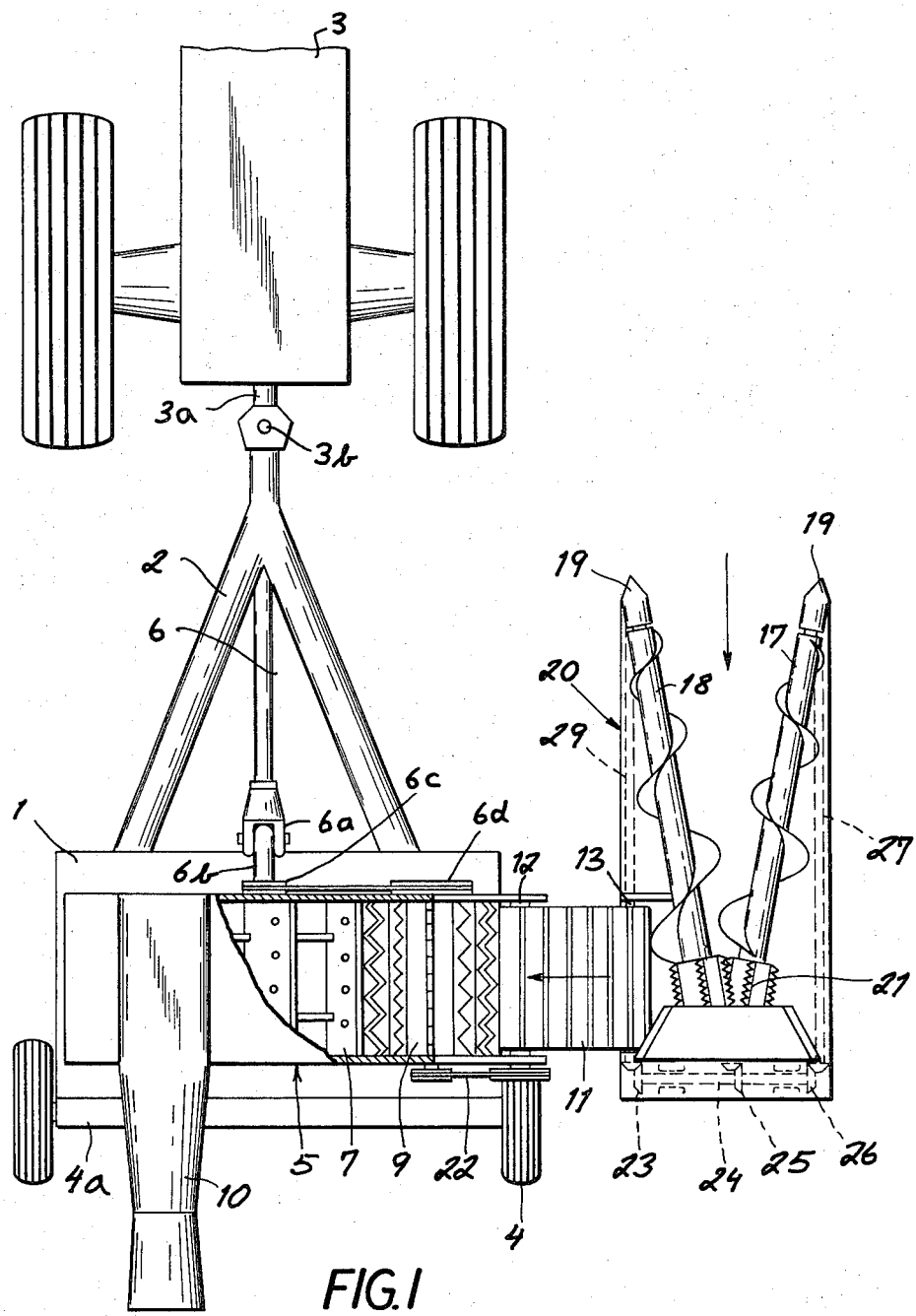
FIG. 1 is a diagrammatic plan view of a field harvester embodying the present invention.
Figure 2:
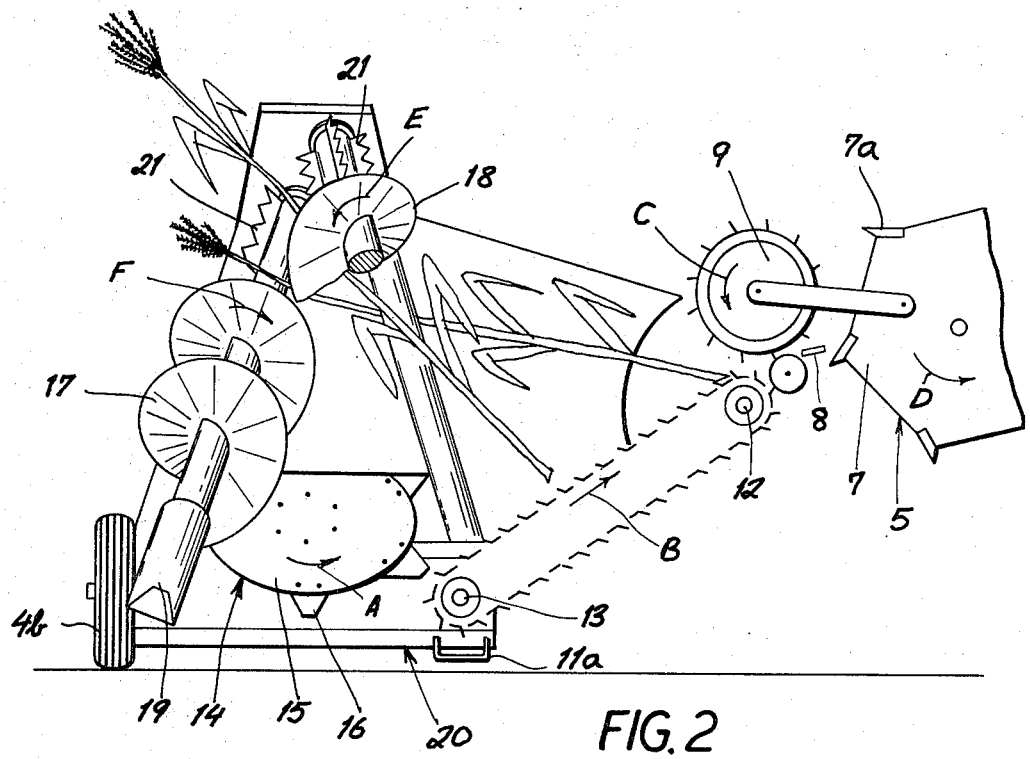
FIG. 2 is a diagrammatic front view, partly broken away.
Figure 3:
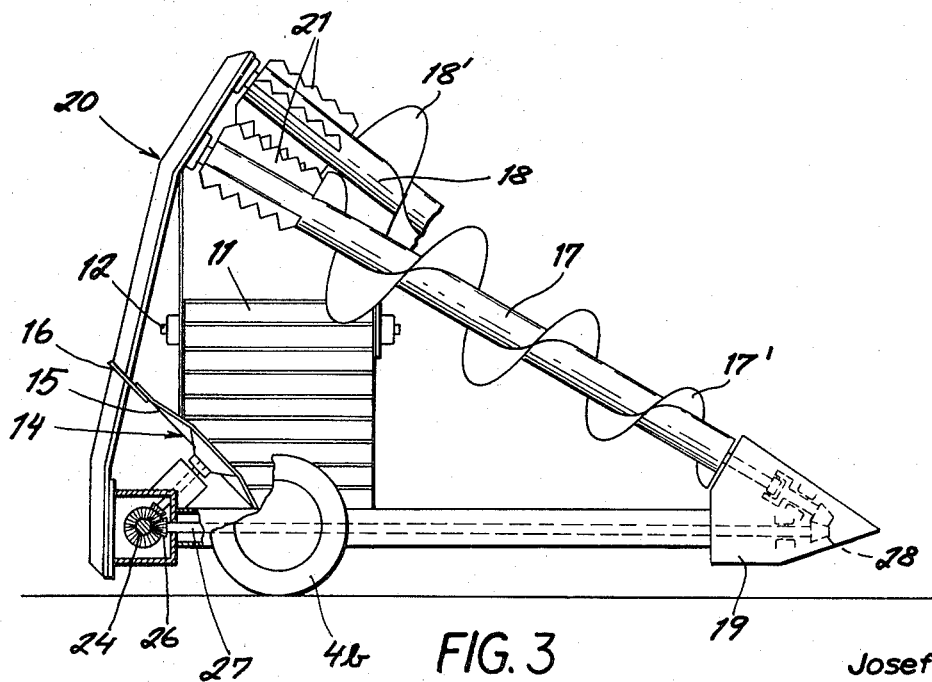
FIG. 3 is a side view, partly in section and partly broken away, of the apparatus.

As best seen in FIGS. 1 – 3, the field chopper of the present invention comprises a frame or superstructure 1 which is connected by a towing frame 2 to a tractor 3. In this embodiment, the tractor 3 has a draw bar 3a to which the hitch 2 is affixed by a pin 3b. The drive shaft 6 is connected to the power-takeoff output shaft of the tractor.

The frame 1 is supported by a pair of ground wheels 4 mounted upon an axle 4a. A further wheel may be provided at 4b directly upon the intake device as shown in FIGS. 2 and 3 or the intake device may be simply mounted upon the structure 1 as designed. The power takeoff shaft is, as noted, connected by the usual universal joints to the shaft 6 which may be connected in turn by a universal joint 6a to the input shaft 6b. The latter is connected by a chain-and-sprocket system 6c to the blade reel 8 of the chopper mechanism 5 and by a chain-and-sprocket mechanism 6d to the feed drum 9. A further chain-and-sprocket arrangement is provided at 22 to operate the conveyer 11, the lower shaft or roll 13 of which is coupled by a shaft 29 and bevel gears 27 with the worm 18. A bevel-gear arrangement 23, in turn, connects the shaft 29 with a shaft 24 from which the cutter disk 14 is driven by bevel gears 25. Bevel gears 26 from shaft 24 drive the shaft 29 which, in turn, rotates the worm 17.

The chopper arrangement 5, shown diagrammatically in the drawing, comprises a drum 7 upon which the blades 7a (FIG. 2) are removably mounted, the blades co-operating with a counterblade or bar 8 (FIG. 2) to provide shearing action. The chopper portion of the apparatus also includes the feed drum 9 which may be toothed or serrated to crush the comminuted crop material. In the usual manner, downstream of the chopper portion 5, is a guide scroll 10 for projecting the comminuted crop material into a forage wagon directly behind or laterally offset from the chopper.

Structurally united with the intake device, via a support structure partly shown at 11a, (FIG. 2) is the transverse conveyer 11 whose upper roll 12 is disposed just below the feed drum 9 and whose lower roll 13 is located adjacent to cutting disk 14 (FIG. 2). The conveyer 11 is formed with teeth, slats, ribs or like projections facilitating entrainment of the crop material to the chopper.

The cutting device 14, which is located at the rearwardmost portion of the throat of the intake device, comprises a disk 15 which is formed along its outer periphery with angularly equispaced radially projecting blades 16. The axis of rotation of the disk 15 is inclined forwardly and includes with the ground surface and angle of approximately 45°.

Ahead of the cutting device 14 in the direction of movement of the forage harvester, and projecting forwardly of the transverse conveyer 11, are two conveyer worms or augers 17 and 18 which run generally in the longitudinal direction but are inclined rearwardly and upwardly and converge in the rearward direction. The tips of the worms 17 and 18 are rotatably journaled in the housing 19 of the intake device which has a supporting frame 20 provided with the aforementioned bar 11a and also carries a cutting device 14 and the transverse conveyer 11. Both worms 17 and 18 run from the housing 19 convergingly rearwardly and upwardly and have their rearmost ends also journaled in frame 20. However, the end of worm 18 is spaced vertically above the end of worm 17 as is best seen in FIG. 3. At this portion of the worms, both are provided with angularly equispaced radially projecting entraining blades 21 which are serrated or toothed along their outer edge and extent along axial planes of the respective worms. The blades 21 of the two worms interfit but nevertheless leave a gap through which the crop material can be fed to the chopper. The worm helices 17' and 18' are of progressively increasing height in the rearward direction and preferably have intersecting or overlapping paths at the upper ends of the worms.

Figure 4:
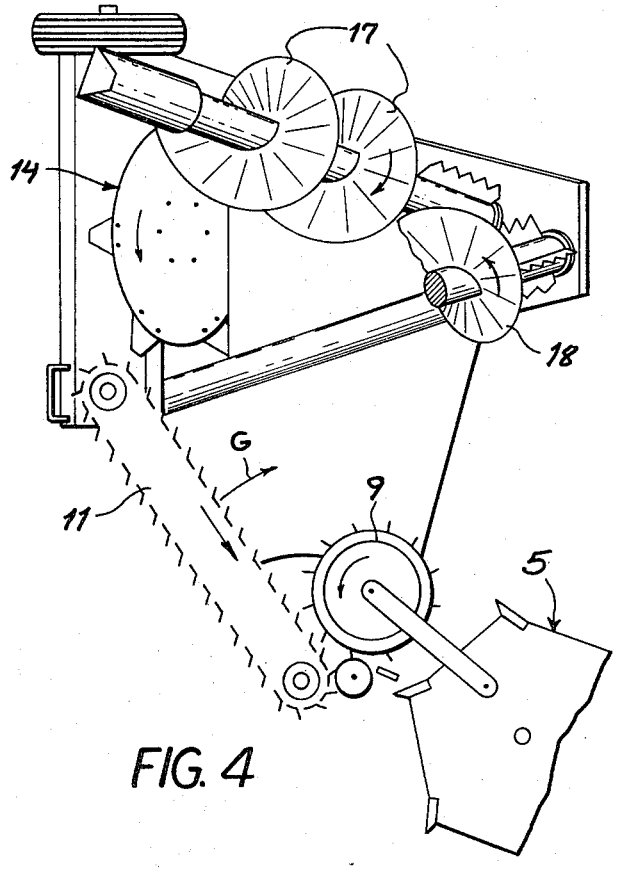
FIG. 4 is a view similar to FIG. 2, but showing the apparatus in its position for road transport.

As noted earlier, the conveyer 11 is driven by a chain-and-sprocket arrangement from the feed drum 9 while the lower roll 13 of the conveyer belt 11 is connected by a bevel-gear arrangement 23 with the transverse shaft 24 journaled in the frame 20. A further bevel gear drive connects the transverse shaft 24 with the shaft of disk 15 while the bevel-gear system 26 of the transverse shaft drives the longitudinally extending shaft 27 running toward the tip of the worm 17. The bevel-gear arrangement 28 in housing 19 connects the worm 17 with the shaft 27. Similarly, the worm 18 is connected with the longitudinal shaft 29 which constitutes an extension of the lower roll 13 of the conveyer. As will be apparent from FIG. 2, the lower portion of the disk 14 moves in the direction of arrow A, i.e. toward the conveyer 11 and in the direction (arrow B) of movement thereof. The underside of the feed drum 9 moves codirectionally with the upper stretch of the conveyer 11 (i.e. in the counterclockwise direction represented by arrow C) while the chopper reel 5 is rotated in the counterclockwise sense (arrow D). The upper worm 18 is driven in the counterclockwise sense (arrow E) to conduct the stalks between the worms, and the worm 17, of course, is rotated in the opposite or clockwise sense, as represented by arrow F. As illustrated in FIG. 4, arrow G, the entire assembly of the worms 17, conveyer the conveyor 11 and the cutting device 14 may be swung upwardly to position the system for rod transport.

In operation, the field harvester is positioned so that the mouth of the intake device, defined by the housing tips or shoes 19, straddles the roll of corn and the harvester is driven forwardly. The worms 17 and 18 conduct the stacks toward the rear or throat of the intake device and gradually swing the tops of the stacks to the left as seen in FIG. 2, while the blades 16 cut the stalks and deposit the cut ends upon the conveyer 11. The conveyer 11 carries the stalks into the chopper 5 from which the comminuted material is propelled via the scroll 10 into the forage wagon.

Figure 5:
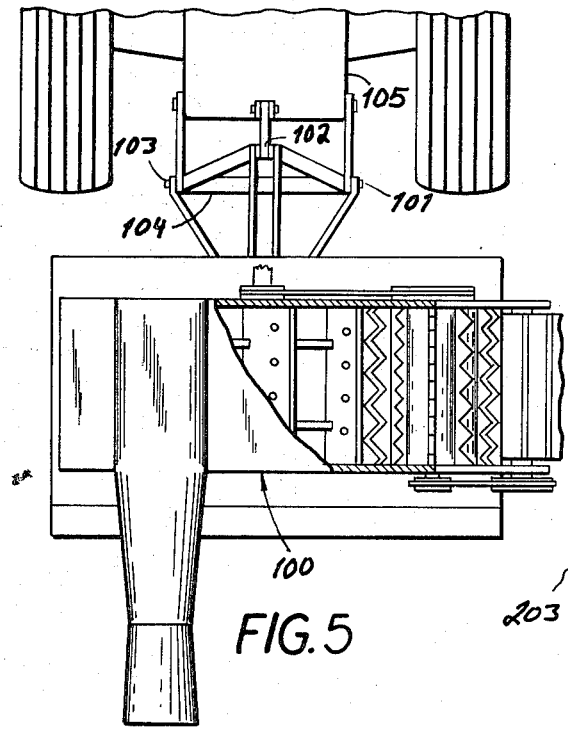
FIG. 5 is a plan view showing the apparatus as mounted directly upon the tractor.
Figure 6:
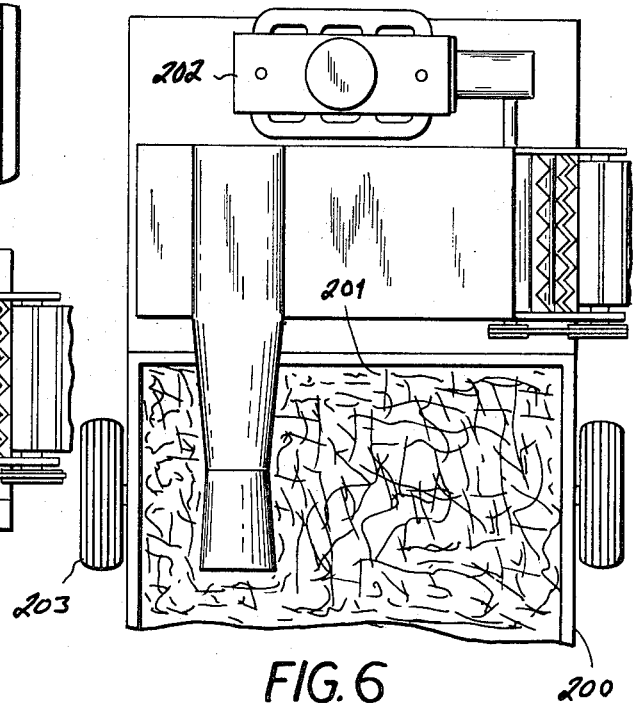
FIG. 6 is a partial plan view showing the apparatus as mounted upon a forage wagon.

As shown in FIGS. 5 and 6, the harvester 100, otherwise identical to that described in connection with FIGS. 1 – 4, can be mounted at the connecting points 101, 102 and 103 of a three-point hitch 104 of the tractor 105. The device may also be built onto the front end 200 of a forage wagon 201 and may be provided with an internal-combustion engine 202 for operation independent of the tractor. The engine may be coupled with the wheels 203 of the forage wagon, thereby constituting of the device a self-propelling vehicle.

I claim:

1. A field harvester, comprising:
   a support for traversing a field having a row crop in a longitudinal direction of movement of the support;
   a chopper on said support for receiving crop material to be chopped in a direction horizontally transverse to said longitudinal direction
   a crop-intake device mounted on said support and having a pair of longitudinally extending adjacent conveyer worms having linear axes of rotation converging rearwardly with respect to the direction of advance of the harvester, said worms having forward lower ends at the same level spaced apart transversely of said longitudinal direction to provide a proximal worm having its lower end closer to the chopper than the lower end of the other relatively distal worm, said proximal worm having a rearward upper end vertically overlying the rearward upper end of the distal worm for guiding a stalk crop longitudinally into said device and laterally feeding said stalk crop to said chopper; and
   conveyer means between said chopper and said device for displacing the guided stalk crop in said transverse direction to said chopper.

2. The field harvester defined in claim 1 wherein each of said worms has a helix intersecting the path of the helix of the other worm at the rearward ends of said worms.

3. The field harvester defined in claim 2 wherein said worms are each provided with co-operating entrainment means at their rearward ends for engagement with said crop and advancing toward said chopper.

4. The field harvester defined in claim 3 wherein said worms are rotated in opposite senses to feed said crop between them to said chopper.

5. The field harvester defined in claim 4, further comprising cutting means disposed at the rearward end of said device close to the ground for severing the stalks of said crop from said ground, the cutting means comprising a disk rotatable about an axis lying in a vertical plane and provided with an array of radial blades.

6. The field harvester defined in claim 5 wherein said axis includes an angle of about 45° with the ground surface.

7. The field harvester defined in claim 5 wherein said conveyer means includes an endless conveyer having a first roll proximal to said chopper and a second roll proximal to said cutting means for conveying the crop from said device to said chopper, said disk being rotated in the direction of said conveyer for carrying said crop onto the latter.

8. The field harvester defined in claim 7 wherein said entrainment means includes a plurality of equispaced serrated blades formed on said rearward ends of said worms, said blades extending along axial planes of the respective worms, said rearward ends being located above the forward ends of said worms.

9. The field harvester defined in claim 7 wherein said support is provided with a pair of wheels and means enabling said support to be towed by said tractor.

10. The field harvester defined in claim 7, further comprising means for mounting said support upon a three-point hitch of a tractor.

11. The field harvester defined in claim 7, further comprising a forage wagon, said support being mounted directly upon said forage wagon.

* * * * *